(No Model.)

R. D. WILLIAMS.
Can Soldering Machine.

No. 241,769. Patented May 17, 1881.

WITNESSES.

INVENTOR

UNITED STATES PATENT OFFICE.

RICHARD D. WILLIAMS, OF BALTIMORE, MARYLAND.

CAN-SOLDERING MACHINE.

SPECIFICATION forming part of Letters Patent No. 241,769, dated May 17, 1881.

Application filed March 3, 1881. (No model.)

*To all whom it may concern:*

Be it known that I, RICHARD DOUGLAS WILLIAMS, of Baltimore city, State of Maryland, have invented certain new and useful Improvements in Can-Soldering Machines; and I hereby declare the same to be fully, clearly, and exactly described as follows, reference being had to the accompanying drawings, in which—

Figure 1:
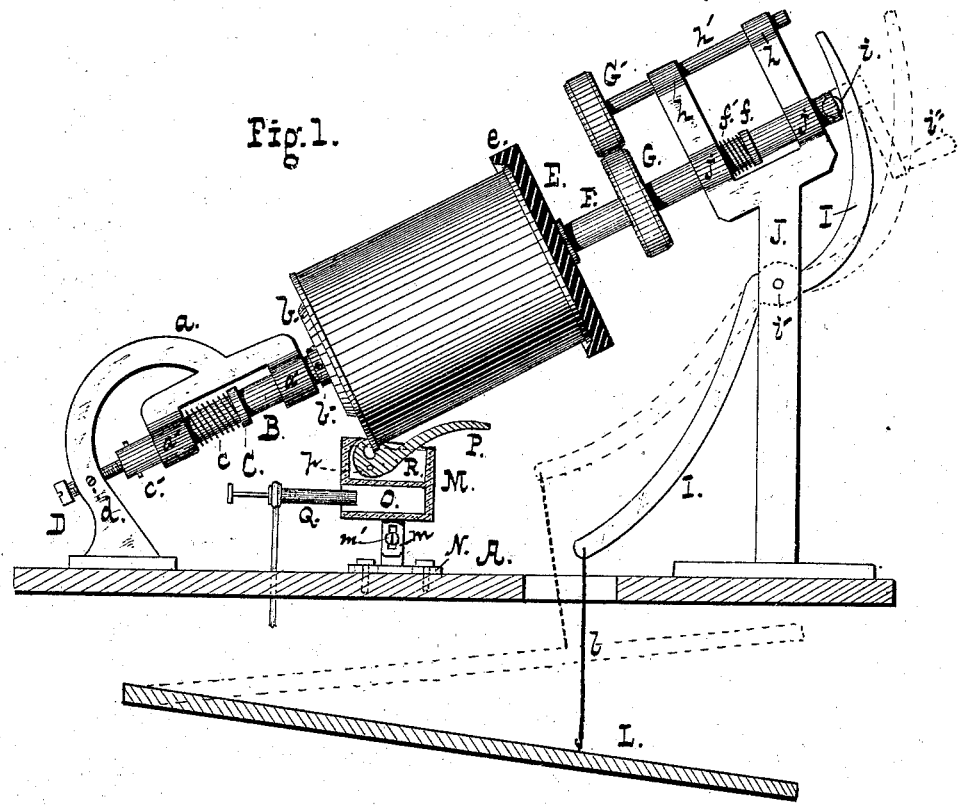
Figure 2:
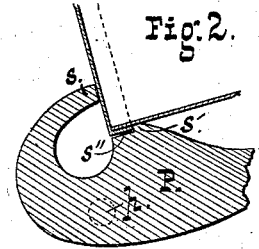
Figure 3:
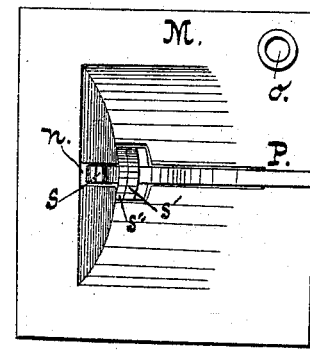

Figure 1 is a side elevation, partly in section, of the machine. Fig. 2 is a sectional view of the can-edge and the soldering-iron as it is applied thereto in soldering the head-seam of the can, and Fig. 3 is a plan of the solder-vessel and the iron.

My invention has reference in general to machines for soldering the head-seams of cylindrical cans, and in particular to that class of said machines in which the soldering is done on the outside of the can, which latter is caused to revolve with the edge of its seam immersed in a bath of molten solder.

In this class of devices as originally constructed and used the cans were simply held by a suitable clamp and revolved in an inclined position, with the lower edge of the head-seam immersed in the molten solder. Later an iron was used in connection with the inclined revolving clamp and solder-bath, the design being to force the solder into the seam and prevent the formation of air-holes or leaks due to insufficient soldering. Inasmuch, however, as a soldering-iron, to do good and satisfactory work, must be of copper in order to "tin" itself, and is necessarily, therefore, soft and liable to be rapidly worn away by contact with the edge of the revolving can, the irons in the machines referred to could not long be relied upon to do their work without stopping the machine and readjusting or sharpening the iron. Being immersed in the solder, moreover, the soldering-edge of the iron was invisible, and its status, as regards wear, was only to be perceived by a critical examination of the cans. Flaws in soldering resulted, which only made themselves apparent when the cans burst in the "process-vats."

The primary object of my invention is to obviate this difficulty by so mounting the iron in the solder-vessel that its soldering-edge is made to touch the can-seam when the can is brought to its position in the solder-bath whether the iron be worn or new.

In the device about to be described the iron is so mounted that it maintains a yielding pressure upon the can-seam during the soldering, and is of such shape that it touches the rim of the head-flange and the can-walls contiguous thereto, effectually forcing the solder into the seam.

My invention consists, first, in a soldering device having an iron which is automatically tilted against the seam as the can is brought into place for soldering; second, in the combination therewith of an inclined revolving can-holder; and, third, in certain features of construction, as hereinafter set forth and claimed.

In the drawings, A is a suitable table or support, to which are bolted two brackets, $a$ and J, having bearings $a'$ and $j$, in which are journaled the shafts B and F. The shaft B has removably secured to its upper end by means of a thumb-screw, $b'$, a disk, $b$, somewhat smaller in diameter than the can-head, being, by preference, of a size to fit within the countersunk portion of the conventional head. The shaft is inclined at an angle of about thirty-five degrees with the horizontal, and carries a collar, C, between which and the lower bearing, $a'$, is coiled a spring, $c$, whereby the shaft is normally thrust upward. The extent of this upward motion is limited by a pin, $c'$, through the shaft, and a screw, D, secured by a set-screw, $d$, through the bracket $a$, limits the movement of the shaft in the opposite direction. The shaft F is accurately in alignment with the shaft B, and carries on its lower end a removable disk, E, having a rim-flange, $e$. The diameter of the disk inside the flange is equal to the diameter of the can-head. The shaft F is also susceptible of a longitudinal movement within its bearings, being normally thrust upward by means of a spring, $f'$, coiled between the lower bearing, $j$, and a collar, $f$. A pulley, G, is mounted on the shaft F, and is driven by frictional contact with a second pulley, G', on a shaft, $h'$, mounted in bearings $h$. In the end of the shaft F is mounted a ball, $i$, which revolves freely in a socket.

To the standard J is pivoted at $i'$ a lever, I, whose lower arm is connected by a wire or cord, $l$, with a treadle, L, the upper arm bearing against the ball $i$.

In lieu of the pulleys G G', I may use a simple crank, $i''$, as shown in dotted lines, and revolve the shaft by hand. In this case the upper end of the lever is bifurcated and bears against a collar on the shaft F.

M is the solder-vessel having an orifice or pipe, o, through which the solder is supplied to its interior or chamber R, below which is a chamber, O, open at one side. Opposite the opening is located a suitable Bunsen gas or gasoline burner, Q. The support m of the solder-vessel is slotted, and is secured by a set-screw, m', to the base N. The bolts which secure the base to the table pass through slots, as shown in dotted lines, whereby the solder-vessel is made adjustable laterally as well as vertically. The upper face of the vessel M is dished, as shown in Fig. 3, to the shape of the section of a cylinder through its base and convex side at an angle of about thirty-five degrees to its axis. It is made, in a word, to substantially fit the can when the latter is brought down into the bath.

Within the vessel M is pivoted the soldering-iron P, which is provided with an upwardly-curved lug, s, a soldering-face, s'', and rib s', the parts s'' s' being formed so as to fit closely against the edge of the seam to be soldered, as shown in Fig. 2. The iron is mounted upon a pivot, p, and has an extended handle, which acts as a counterpoise, and normally rests on the edge of the vessel M. The iron is mounted within a slot, n, in the upper face of the solder-vessel, which slot permits the solder to flow upon the concave top of the vessel and form a little pool, in which the soldering-face of the iron is immersed.

The parts s' s'' may, if desired, be laterally extended, as shown in Fig. 3, or the iron may be of uniform thickness throughout. The illustrated construction is to be preferred, as it furnishes a more extended soldering-surface.

In operation, solder being supplied to the vessel M, and being therein melted by the flame from the burner Q, the cans are headed and placed one by one with their upper heads against the disk E and within its flange e. On depressing the treadle L the shaft F is pressed downward, bringing the other head of the can against the disk b and depressing the shaft B. The lower head of the can, as it encounters the lug s and enters the solder-bath, tilts the iron about its pivot, bringing the faces s' s'' closely against the seam. The contact of the pulleys meanwhile causes the disks and can to turn, bringing every part of the seam into contact with the iron. The revolution continues as long as the treadle remains depressed. On releasing it the springs c f' cause the shafts to slide upward in their bearings, carrying the can upward clear of the bath.

The range of motion of the two shafts B and F is purposely made unequal, the pin c' arresting the motion of the lower shaft and its disk before the collar f of the upper shaft abuts against the upper bearing, j, whereby the disks are normally separated far enough to enable one to easily insert and remove the cans.

It will be seen that the iron automatically tilts against the seam as the can enters the bath, and is pressed against the seam with a force in proportion to that imposed upon the treadle. The operator is soon enabled to properly adjust the pressure, as the iron acts somewhat after the manner of a brake, and its pressure is plainly perceptible to the operator through the medium of the treadle. It is obviously much more readily perceptible in case the shaft is revolved by hand.

The object of making the disks removable is to admit of cans of various sizes being soldered upon the machine, wherefore, also, the vessel M is made vertically and laterally adjustable, as above described.

It is obvious that no matter how fast the iron may wear away it is bound to touch the seam as the can is brought down into the bath of molten solder, and this insures a satisfactorily soldered seam. It is furthermore equally clear that this action of the iron is in no wise dependent upon the peculiar construction and arrangement of revolving can-holder, nor, indeed, is it essential that a mechanical device for this purpose be used at all. The iron will do its work well if the can is simply revolved by hand in the position shown in the drawings, and I therefore do not limit myself to the use of any, or any particular, mechanism in connection with the iron.

As the pivot of the iron is beyond the plane of the can-head, the soldering-face tilts away from the can the instant the pressure upon the lug is relieved, avoiding all tendency to displace the soldered head.

Instead of pivoting the iron, it might simply rest with its curved lower face upon a correspondingly-curved portion of the solder-vessel, when it would tilt precisely as if pivoted in the manner described.

By the term "automatically tilting," which, for the sake of brevity, I have applied to the iron, I mean an iron whose soldering-face is normally held below the position occupied by the seam to be soldered, but which tilts upward against the seam in the act of immersing the latter in the bath of solder.

Having thus described my invention, what I claim is—

1. In a soldering-machine, a solder-bath in combination with an automatically-tilting soldering-iron, substantially as set forth.

2. In a soldering-machine, a solder-bath having a soldering-iron pivoted therein, and provided with a projecting lug, as set forth, whereby the soldering-face of the iron is tilted against the seam as the can encounters the lug.

3. In a soldering-machine, a soldering-iron rotatably arranged in a solder-vessel, and having a soldering-face adapted to the seam to be soldered, and a projecting lug arranged in the line of feed of the can, as and for the purpose set forth.

4. In a can-soldering machine, the combination of a solder-vessel provided with a recess adapted to substantially fit the can as the latt..r is brought into position for soldering, with a soldering-iron so mounted upon the solder-vessel as to automatically tilt against the seam as the can is brought into position for soldering, as set forth.

5. In a can-soldering machine, the combination of a solder-vessel and an automatically-tilting iron, the axis of rotation of the iron being beyond the plane of the can-head when in position for soldering, as s.. forth.

6. In a can-soldering machine, the combination of a solder-vessel, an automatically-tilting iron, and a revolving can-holder, as set forth.

7. In a can-soldering machine, an inclined revolving can-holder, a solder-vessel having a recess conforming to the shape of the can, and an automatically-tilting soldering-iron, as set forth.

8. In a can-soldering machine, the combination of a pair of disks mounted upon shafts that reciprocate longitudinally in inclined bearings, and adapted to center the can in the axis of the shafts, a solder-vessel, and an automatically-tilting soldering-iron, as set forth.

9. In a soldering-machine, the combination of a revolving can-holder, a solder-vessel, and an automatically-tilting soldering-iron, and mechanism for bringing the can-holder into position for immersing the can-seam in the solder, and incidentally tilting the iron against the seam, as set forth.

10. In a can-soldering machine, a pair of shafts carrying disks for clamping the can, a solder-vessel, and a soldering-iron, the said shafts having a longitudinal motion through their bearings, whereby the can-edge is carried into and out of the bath, as set forth.

11. In a can-soldering machine, a pair of shafts in alignment, and carrying clamping-disks, as set forth, each shaft having a determined sliding motion in its bearings, the range of motion of the upper shaft being greater than that of the lower, in combination with mechanism for soldering the seam of the clamped can, as described.

12. In a soldering-machine, a revolving inclined can-holder and a solder-vessel adjustable in relation thereto, and having an automatically-tilting soldering-iron, whereby cans of different sizes may be soldered, as set forth.

13. In a can-soldering machine, the combination of an inclined revolving can-holder, reciprocating in its bearings, a solder-vessel vertically and laterally adjustable with reference thereto, and a soldering-iron, as set forth.

14. In a soldering-machine, an iron having a lug, $s$, which, upon being depressed by the can-head, tilts the soldering-face against the can-seam, as set forth.

15. The soldering-iron herein described, having a soldering-face, $s'' s'$, conforming to the can-seam, and a lug, $s$, adapted to tilt the iron, as set forth.

16. The soldering-iron herein described, having the laterally-extended curved soldering-face $s' s''$, lug $s$, and counterpoising portion, as set forth.

RICHD. D. WILLIAMS.

Attest:
JOHN C. GITTINGER,
G. A. WILLIAMS.